(12) United States Patent
Fujishiro et al.

(10) Patent No.: US 6,765,071 B1
(45) Date of Patent: Jul. 20, 2004

(54) COMPOSITION OF AROMATIC POLYEPISULFIDE, POLYGLYCIDYL ETHER AND/OR ESTER, AND ACID ANHYDRIDE

(75) Inventors: Koichi Fujishiro, Chiba (JP); Hiroshi Ogata, Chiba (JP); Fumihiro Ohmori, Chiba (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/111,448

(22) PCT Filed: Nov. 8, 2000

(86) PCT No.: PCT/JP00/07845

§ 371 (c)(1),
(2), (4) Date: Apr. 26, 2002

(87) PCT Pub. No.: WO01/34676

PCT Pub. Date: May 17, 2001

(30) Foreign Application Priority Data

Nov. 9, 1999 (JP) ............................................ 11-318541
Nov. 22, 1999 (JP) ............................................ 11-331362

(51) Int. Cl.$^7$ .......................... C08L 63/00; C08L 63/02
(52) U.S. Cl. ...................................... 525/533; 525/525
(58) Field of Search .................................. 525/533, 525

(56) References Cited

U.S. PATENT DOCUMENTS 5,182,340 A  *  1/1993  Hefner, Jr. et al. ......... 525/525
6,117,923 A     9/2000  Amagai et al. ............. 523/440

FOREIGN PATENT DOCUMENTS

| DE | 1816281 A | * | 6/1970 | | |
| EP | 0 874 016 | | 10/1998 | | |
| EP | 0 921 417 | | 6/1999 | | |
| JP | 09-071580 | | 3/1997 | | |
| JP | 09-110979 | | 4/1997 | | |
| JP | 10-298277 | | 11/1998 | | |
| JP | 11-100435 A | * | 4/1999 | | |
| JP | 11-100435 | | 4/1999 | | |
| JP | 11100435 A | * | 4/1999 | ........... | C08G/59/42 |
| JP | 11-140161 | | 5/1999 | | |
| JP | 11-209689 A2 | * | 8/1999 | | |
| JP | 11-279173 | | 10/1999 | | |

OTHER PUBLICATIONS

"New Acyl–Group Transfer Polymerization of Thiiranes Using Carboxylic Acid Derivatives and Quaternary Onium Salts". Polymer Journal, vol. 28, No. 1, pp. 68–75 (1996).

* cited by examiner

Primary Examiner—Robert Sellers
(74) Attorney, Agent, or Firm—Rader Fishman & Grauer PLLC

(57) ABSTRACT

This invention relates to a resin composition containing an aromatic episulfide which exhibits excellent moldability, heat resistance and optical properties. The composition comprises an aromatic episulfide compound (A) having two or more reactive groups represented by the following formula (1)

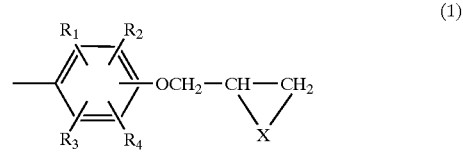

(1)

(wherein X is O or S with S accounting for 50 mol % or more of X on the average and $R_1$–$R_4$ are independently hydrogen, halogen or an alkyl group with 1–4 carbon atoms) in its molecule, a glycidyl compound (B) composed of an aromatic glycidyl ether compound having two or more glycidyl groups in its molecule or a glycidyl ester compound having two or more glycidyl groups in its molecule, an acid anhydride (C) and a curing catalyst (D) as essential components and shows the following molar ratios of β-epithiopropyl group (a), glycidyl group (b) and acid anhdyride group (c); [(b)+(a)]/(c)=1.35–3.5, (a)/(c)=0.5–2.2 and (b)/(c)=0.5–1.9.

3 Claims, No Drawings

COMPOSITION OF AROMATIC POLYEPISULFIDE, POLYGLYCIDYL ETHER AND/OR ESTER, AND ACID ANHYDRIDE

FIELD OF TECHNOLOGY

This invention relates to a resin composition containing an aromatic episulfide. The resin composition is used as a liquid resin molding material which exhibits excellent moldability required for sealing electrical parts, electronic parts and semiconductor chips by potting or casting and excellent moisture resistance after curing. Furthermore, the resin composition is used as optical materials such as plastic lenses, prisms, optical fibers, optical films and filters, adhesives for the aforementioned optical materials and coatings and also used in sealing light-emitting devices and light sensors.

BACKGROUND TECHNOLOGY

With a rapid growth of electronics in recent years, semiconductor devices such as IC and LSI are used in various fields and a trend to lower cost and higher integration has brought forth a variety of new packaging schemes; dual in-line package by transfer molding with the use of a conventional mold is being replaced by moldless spot sealing of bare chips such as hybrid IC, chip on board, tape carrier package and plastic pin grid array. Curing agents for these liquid epoxy resin molding materials include amines such as dicyandiamide and dihydrazideaminimide compounds and liquid acid anhydrides such as hexahydrophthalic acid anhydride, tetrahydrophthalic acid anhydride and methylhimic anhydride. They were defective, however, as the former were strongly polar to lower the bias properties while hydrolyzed extensively in the pressure cooker test (PCT) and suffered from deterioration of adhesiveness after absorption of moisture. For this reason, an attempt was made to use solid novolac type phenolic resin as a curing agent, but the molding material became highly viscous with some loss in moldability and, to its disadvantage, required the simultaneous use of an organic solvent.

In the cases where liquid epoxy resin such as bisphenol A type epoxy resin and alicyclic epoxy resin is cured by an acid anhydride curing agent for ease of molding a composition, the optimal epoxy resin to acid anhydride ratio which gives the highest glass transition temperature and the lowest water absorption is decided (for example, epoxy group/acid anhydride group=1.0/0.75–1.0/0.9 on a mole basis in case a tertiary amine catalyst is used); still the water absorption is high in excess of 2% and the refractive index is unsatisfactorily 1.55 or less.

Novel alkylsulfide type episulfides, their compositions and cured products are proposed in JP9-71580 A(1997) and JP9-110979 A(1997). An alkylsulfide type episulfide cures by the use of an amine catalyst into a good optical material with a softening point of 100° C. or more, a refractive index of 1.69 or more and an Abbe number of 35 or more. In the patents, an explanation is found of a composition which uses a primary amine or an acid anhydride as a curing agent; however, an example in which a primary amine is used gives a cured product with a low softening point of 100° C. or less and records no concrete data such as refractive index and water absorption regarding the cured product by the use of an acid anhydride and the effect of the curing agent used is not clear. Moreover, a compound containing a mixture of epoxy and episulfide groups presents a problem of curing with low heat resistance and/or low strength and no concrete description is found of a composition containing this kind of compounds and an acid anhydride as a curing agent and of the properties of cured product.

Nishikubo et al. have reported that a combination of a thioester initiator and a quaternary ammonium salt catalyst is the most active in the polymerization of episulfide compounds; refer, for example, to Polymer Journal, 28(1), pp 68–75, 1996 or Prpg. Polymn. Sci, Vol. 18, pp 963–995, 1993. J. P. Bell et al. are conducting research on the curing reaction involving an episulfide compound and a primary amine. No literature in public knowledge refers to the curing reaction involving an episulfide compound and an acid anhydride curing agent.

Transparent resins are attracting attention as optical materials and they are used in optical lenses, films, prisms and base materials for optical disks because of their lightweight, impact resistance and ease of molding. Moreover, they are used extensively in optical fibers for utilization of their optical properties and also used as manufacturing aids such as sealing materials for optical disks, light-emitting devices and light sensors, coatings, and adhesives.

Resins which are practically used in optical applications at the present time include poly(methyl methacrylate), poly[diethylene glycol bis(aryl carbonate)], polystyrene and polycarbonate as optical lenses and poly(methyl methacrylate) and poly[diethylene glycol bis(aryl carbonate)] as lenses for correction of faulty vision.

However, both poly(methyl methacrylate) and poly[diethylene glycol bis(aryl carbonate)] show a low refractive index on the order of 1.50. When the methacrylic resin is used as a lens for correction of faulty vision, it suffers from the defect of the thickness of lens at the edge becoming greater compared with a lens of inorganic glass and it has additional weakness as it is apt to absorb moisture, deform and change in refractive index and shows a heat resistance of 100° C. or less. On the other hand, the polycarbonate is high in both refractive index and heat resistance, but it shows a defective tendency to absorb moisture and deform.

In those devices which utilize light such as optical disks, optical fibers, optical films for use in liquid crystal displays and light-emitting devices, operations such as pasting, joining and sealing are performed by the use of transparent resins as adhesives, coatings and sealing materials. The properties required for these optical materials include not only transparency but also low birefringence, low moisture absorption, high heat resistance, good quality for precision molding and matching in refractive index to components to be joined (refer, for example, to JP10-67977 A(1998) and Polyfile, July issue, p. 28, 1999).

Transparent resins of thermal crosslinking type are proposed in consideration of the aforementioned points and heat-curable optical materials possessing a thiourethane structure obtainable from the reaction of a polythiol and a polyisocyanate are proposed in JP4-58489 B(1992), JP5-148340 A(1993) and JP10-120676 A(1998). However, the materials in question are defective in that the pot life from mixing of the resin components to molding is short and no reference is found in these patents to lowering of water absorption.

An object of this invention is to provide a liquid resin molding material suitable for sealing semiconductors which is liquid before curing, cures with a high rate with good productivity, possesses after curing a glass transition temperature higher than the pressure cooker test (PCT) temperature of 121° C., and is characterized by high heat resistance, low moisture absorption, good workability and excellent moisture resistance reliability after packaging.

Another object of this invention is to provide a curable resin composition which is characterized not only by transparency but also by low moisture absorption, high heat resistance, quality for precision molding and matching in refractive index to components to be joined and to provide the cured composition as an optical material.

DISCLOSURE OF THE INVENTION

This invention relates to a resin composition which comprises an aromatic episulfide compound (component A) having two or more reactive groups represented by the following formula (1)

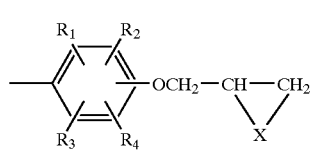

(1)

(wherein X is O or S with S accounting for 50 mol % or more of X on the average and $R_1$–$R_4$ are independently a hydrogen atom, a halogen atom or an alkyl group with 1–4 carbon atoms) in its molecule, at least one kind of glycidyl compound (component B) selected from an aromatic glycidyl ether compound (B1) having two or more glycidyl groups in its molecule and a glycidyl ester compound (B2) having two or more glycidyl groups in its molecule, an acid anhydride (component C) and a curing catalyst (component D) as essential components and satisfies the following criteria regarding the proportion of functional groups in the components and the amounts of the components; the total of the glycidyl and β-epithiopropyl groups is 1.35–3.5 moles, the amount of the β-epithiopropyl group is 0.5–2.2 moles and the amount of the glycidyl group is 0.5–1.9 moles per 1 mole of the acid anhydride group and the amount of component D is 0.01–5 parts by weight per 100 parts by weight of the total of components A, B and C.

Moreover, this invention relates to the aforementioned resin composition wherein the total of the glycidyl and β-epithiopropyl groups is 1.35–3.5 moles, the amount of the β-epithiopropyl group is 0.5–2.2 moles and the amount of the glycidyl group is 0.5–1.6 moles per 1 mole of the acid anhydride group.

Still more, this invention relates to a cured product which is obtained by curing the aforementioned resin composition by polymerization and useful as an optical material with a refractive index of 1.5 or more and a water absorption (saturated water absorption at 85° C. and 85% RH) of 1% or less.

Aromatic episulfide compounds (component A) having the reactive group represented by formula (1) are prepared by a known method from known aromatic glycidyl ether compounds (also known as epoxy resins). Such aromatic glycidyl ether compounds include aromatic glycidyl ether compounds having two or more glycidyl ether groups in the molecule obtained by the reaction of epichlorohydrin with bisphenols such as bis(4-hydroxyphenyl)ketone, bis(4-hydroxyphenyl)sulfone, 2,2-bis(4-hydroxyphenyl)propane, bis(4-hydroxyphenyl)ether, bis(4-hydroxyphenyl) hexafluoropropane, 9,9-bis(4-hydroxyphenyl)fluorene, bis(4-hydroxyphenyl)dimethylsilane, 4,4'-biphenol and tetramethyl-4,4'-biphenol, polyfunctional phenols such as phenolic novolac, cresolic novolak, naphtholic novolac and condensation products of naphthol or naphthalenediol with 1,4-xyleneglycol, or the foregoing phenols whose hydrogen atoms on the aromatic rings are substituted wholly or partly by halogen atoms and alkyl groups with 1–4 carbon atoms. They may be used singly or as a mixture.

A compound containing the episulfide group is prepared by treating one of the aforementioned glycidyl ether compounds with a thio compound such as a thiocyanate, thiourea, triphenylphosphine sulfide and 3-methylbenzothiazole-2-thione, preferably with a thiocyanate or thiourea, thereby converting the glycidyl group partly or wholly to a thiuronium salt. The thio compound here is used stoichiometrically in an amount equimolar to or greater than that of the epoxy group and the use of a slight excess is desirable in consideration of product purity and reaction rate. On the other hand, if the objective is the partial conversion of the glycidyl group in a glycidyl ether compound to the β-epithiopropyl group, the use of less than an equimolar amount poses no problem. If the preparation of a resin composition capable of accomplishing the object of this invention is taken into consideration, it is necessary to convert the epoxy group to the β-epithiopropyl group at a rate of 50 mol % or more and, in turn, it is necessary to use a thio compound in an amount equal to ½ or more of the theoretical amount on a mole basis.

The reaction can be carried out either solventless or in a solvent. In case a solvent is used, the reaction is desirably carried out in a heterogeneous system by dispersing a thio compound or an aromatic glycidyl ether compound finely in a solvent or a solvent capable of dissolving either of the compounds is used in order to improve the yield of the target compound. Concrete examples of solvents are water, alcohols such as methanol, ethanol and isopropanol, ethers such as diethyl ether, dioxane and diglyme, aromatic hydrocarbons such as benzene, toluene and xylene and halogenated hydrocarbons such as chloroform and chlorobenzene. It is possible to carry out the reaction in a mixed solvent, for example, in two phase by a combination of water and an aromatic hydrocarbon. In this case, it is possible to wash out the unreacted glycidyl ether compound at the same time.

It is desirable to add an acid as a reaction promoter to the reaction mixture. Examples of such acids are nitric acid, sulfuric acid, hydrochloric acid, phosphoric acid, acetic acid and propionic acid and these acids may be used together. The amount to be added is 0.1–20 wt % of the total reaction mixture. The reaction temperature is normally 20–100° C. and the reaction time is usually 20 hours or less. As the intermediate product is usually obtained as solid, it is collected by filtration, washed with a solvent capable of dissolving the raw material aromatic glycidyl ether compound such as toluene to remove the unreacted raw material and then washed further with water until the pH of the washings becomes 3–5. The intermediate thus obtained is pulverized and dispersed in an excess of aqueous sodium carbonate or potassium carbonate at 20–70° C. for 2–20 hours. The solid reaction product is then washed with water, dried and dissolved in an organic solvent such as toluene and the insoluble unreacted salt is filtered off to obtain a solution of the target aromatic episulfide. The target compound can be obtained by stripping the solvent from this solution.

The glycidyl compound having two or more glycidyl groups in its molecule (component B) to be used in this invention is at least one kind selected from an aromatic glycidyl ether compound (B1) and a glycidyl ester compound (B2). In order to obtain a resin composition as liquid, the selected components B1 and B2 are desirably liquid. Component B1 is preferred for the purpose of obtaining a composition of lower water absorption.

Known aromatic glycidyl ether compounds can be used as B1 and they include concretely bisphenol type epoxy resin, bisphenol F type epoxy resin, bisphenol AD type epoxy resin and novolac type epoxy resin. It is also possible to use glycidyl ether type epoxy resin similar to the one which serves as a raw material of the aforementioned component A.

Known glycidyl ester compounds can be used as B2 and they are concretely diglycidyl phthalate, diglycidyl hexahydrophthalate and diglycidyl tetrahydrophthalate. They may be used singly or as a mixture of two kinds or more. Moreover, these glycidyl compounds are preferably liquid and those glycidyl compounds which are solid at room temperature can advantageously be blended by melting under heat and made liquid as a mixture.

Any known acid anhydride useful as a curing agent can be used as the acid anhydride (component C) of this invention and concrete examples of such acid anhydrides are alicyclic acid anhydrides such as methyltetrahydrophthalic anhydride, methylhexahydrophthalic anhydride, methylhimic anhydride, tetrahydrophthalic anhydride, hexahydrophthalic anhydride and methylcyclohexenedicarboxylic acid anhydride, aromatic acid anhydrides such as phthalic anhydride, trimellitic anhydride, pyromellitic dianhydride, benzophenonetetracarboxylic acid dianhydride, ethylene glycol bis(trimellitate) dianhydride and glycerol tris (trimellitate) trianhydride, and halogenated acid anhydrides such as HET acid anhydride and tetrabromophthalic anhydride. Liquid alicyclic acid anhydrides are preferable from the viewpoint of transparency and ease of molding and they may be used singly or as a mixture of two kinds or more. It is advantageous to render a mixture liquid by mixing the selected acid anhydride with low-melting hexahydrophthalic anhydride.

A curing catalyst (component D) is used in this invention for the purpose of curing the composition by heating. It is possible to use any curing catalyst known for the epoxy resin/acid anhydride curing system and what is useful here is the one which gives the target cured product when mixed with the aforementioned components A, B and C and heated at 50–200° C., preferably at 50–180° C., more preferably at 80–180° C.

Curing catalysts are exemplified by tertiary amines, phosphines, quaternary ammonium salts and Lewis acids. Concrete examples are tertiary amines such as triethylamine, triphenylamine, tri-n-butylamine, N,N-dimethylaniline and pyridine, imidazole and its derivatives such as imidazole, N-methylimidazole, 2-methylimidazole, 4-methylimidazole and 1-benzyl-2-methylimidazole, diamines such as 1,8-diazabicyclo(5,4,0)undecene-7,1,5-diazabicyclo(4,3,0) nonene and 5,6-dibutylamino-1,8-diazabicyclo(5,4,0) undecene-7, adducts of tertiary amines represented by the foregoing with organic acids, quaternary ammonium salts resulting from the aforementioned amines and halogens, Lewis acids, organic acids, mineral acids and tetrafluoroboric acid, phosphines such as triethylphosphine, triphenylphosphine and tri-n-butylphosphine and Lewis acids represented by boron trifluoride and boron trifluoride etherate. Of these examples, imidazoles and phosphines are preferable from the viewpoint of reliability of semiconductor devices while microencapsulated latent curing agents of the two are preferable from the viewpoint of pot life. In case an optical material is intended, imidazoles and quaternary ammonium salts, preferably the latter, are desirable because they give cured products of reduced coloration.

The aforementioned compounds may be used singly or as a mixture of two kinds or more. The curing catalyst or component D is used in an amount of 0.01–5 parts by weight, preferably 0.01–3 parts by weight, more preferably 0.1–2 parts by weight, per 100 parts by weight of the total of components A, B and C. Water absorption of the cured product increases when the amount of curing catalyst is more than 5 parts by weight while curing occurs insufficiently with unsatisfactory heat resistance when the amount is less than 0.01 part by weight.

It is allowable to add a thioester compound or a mercaptan compound as an initiator to the resin composition of this invention and thioester compounds boiling at 100° C. or more are preferable as they give the composition a longer pot life and reduce coloration of the cured product. Concrete examples of mercaptan compounds are 2-mercaptoethanol, ester-containing aliphatic mercaptan compounds such as 2-ethylhexyl thioglycolate and 2-ethylhexyl 3-mercaptopropionate and polymercapto compounds such as trimethylolpropane tris($\beta$-thiopropionate) and pentaerythritol tetrakis($\beta$-thiopropionate). Examples of thioesters are S-phenyl thioacetate and thioacetates and thiobenzoates of the aforementioned mercaptan compounds.

The initiator is added normally in an amount of 0.01–5 parts by weight, preferably 0.05–3 parts by weight, more preferably 0.05–2 parts by weight, per 100 parts by weight of the total of components A, B and C. The pot life of the composition shortens and the heat resistance of the cured product deteriorates when the initiator is added in an amount in excess of 5 parts by weight.

In order for the cured resin composition of this invention to exhibit both low water absorption and good heat resistance or these two properties plus high refractive index, the composition of components A, B and C is so formulated as to obtain the following proportion of the functional groups in the components; the total of the glycidyl and $\beta$-epithiopropyl groups is 1.35–3.5 times, preferably 1.5–3.2 times, the amount of the acid anhydride group on a mole basis while the amount of the $\beta$-epithiopropyl group is 0.5–2.2 times, preferably 0.5–2.0 times, and the amount of the glycidyl group is 0.5–1.9 moles, preferably 0.5–1.6 times, the amount of the acid anhydride group on a mole basis. More preferably, the amount of the glycidyl group is 0.5–1.3 times in case the liquid moldability is important or 0.5–1.5 times in case the optical characteristics are important.

Component A can have the glycidyl and $\beta$-epithiopropyl groups depending upon the kind of X in general formula (1). Component B has the glycidyl group and component C has the acid anhydride group $[=(CO)_2O]$. A compound whose one mole contains n acid anhydride groups is defined as n moles of acid anhydride groups. Likewise, a compound whose one mole contains n glycidyl groups is defined as n moles of glycidyl groups and a compound whose one mole contains n moles of $\beta$-epithiopropyl groups is defined as n moles of $\beta$-epithiopropyl groups. When a compound has both glycidyl and $\beta$-epithiopropyl groups, the number n is computed by proration.

Compounds having $\beta$-epithiopropyl groups are generally solid at room temperature; solventless compositions containing them are not easy to handle alone and form brittle films when applied as coatings. On the other hand, curing of the glycidyl group alone does not give a product of sufficiently crosslinked structure. When a compound having a mixture of the $\beta$-epithiopropyl and glycidyl groups is cured in the presence of a catalyst for the purpose of controlling the refractive index of the cured product at will, curing of the $\beta$-epithiopropyl group proceeds at a higher rate than that of the glycidyl group and the unreacted glycidyl group remaining in the cured product causes white turbidity and lowers the glass transition temperature as a result of phase separation. According to this invention, an acid anhydride curing agent is allowed to coexist in the system whereby the curing catalyst activates the acid anhydride group to initiate the curing reaction and lets the acid anhydride group to participate in the curing reaction together with the β-epithiopropyl and glycidyl groups to give a cured product with good heat resistance or uniform transparency or both.

Furthermore, this invention makes it possible to obtain the target properties by increasing the latitude in controlling the viscosity of a composition by letting the three of glycidyl, β-epithiopropyl and acid anhydride groups coexist and at the same time controlling the proportion of components A, B and C in the aforementioned range. That is, controlling the total of the glycidyl and β-epithiopropyl groups at a level of 1.35 moles or more per 1 mole of the acid anhydride group has made it possible to eliminate the unreacted acid anhydride groups in the cured product thereby lowering the water absorption. In addition, controlling the β-epithiopropyl group at a level of 0.5 mole per 1 mole of the acid anhydride group has made it possible to lower the proportion of the ester linkage in the cured product thereby lowering the water absorption (saturated water absorption at 85° C. and 85% RH) to less than 1%.

On the other hand, coexistence of 0.5 mole or more of the glycidyl group per 1 mole of the acid anhydride group has caused cross linking to occur primarily at the thioester linkage thereby keeping the glass transition temperature from lowering. Furthermore, this invention is distinguished in that the coexistence of three functional groups makes it possible to maintain the glass transition temperature at the specified level without leaving the unreacted functional groups in the cured product and at the same time increase the refractive index and lower the water absorption even if a given composition contains up to 1.9 moles of the glycidyl group and up to 2.2 moles of the β-epithiopropyl group per 1 mole of the acid anhydride group.

However, the water absorption increases when the total of the glycidyl and β-epithiopropyl groups becomes less than 1.35 moles per 1 mole of the acid anhydride group while the unreacted glycidyl group remains in the cured product and the glass transition temperature falls when the total exceeds 3.5 moles. The glass transition temperature of the cured product falls when the glycidyl group is less than 0.5 mole or greater than 1.3 moles. In particular, when the glycidyl group is in excess of 1.9 moles, some remains unreacted in the cured product thereby lowering the glass transition temperature and lessening the effect of enhancing the refractive index. Lowering the water absorption of the cured product for which the β-epithiopropyl group is intended is not accomplished sufficiently when the β-epithiopropyl group is less than 0.5 mole while the cured product becomes brittle when the β-epithiopropyl group exceeds 2.2 moles.

In the case where an epoxy compound containing only the glycidyl group is cured by an acid anhydride in the presence of a curing catalyst, the presence of 1.1–1.25 moles of the glycidyl group per 1 mole of the acid anhydride group results in the highest glass transition temperature and the lowest water absorption, although still in excess of 2%, but an amount outside this range causes the group to remain unreacted to a considerable extent thereby lowering the glass transition temperature. In the case where a compound containing only the β-epithiopropyl group is cured by an acid anhydride, the thioester linkage increases in the cured product and the glass transition temperature is short of a satisfactory level. Moreover, the aforementioned cured products suffer from a narrow latitude in control of the refractive index as they are not related to a mixed system of compounds containing the glycidyl and β-epithiopropyl groups.

As described above, by devising a resin composition comprising the four components A, B, C and D, this invention accomplishes a wide latitude in control of the viscosity of the composition and endows the cured product with both low water absorption and good heat resistance.

Moreover, the resin composition of this invention can be made to serve as a liquid resin molding material and what is required in this case is that the aforementioned four components A, B, C and D are essential and a mixture of the four is liquid without the use of a solvent. Since component A is usually solid at room temperature, it is necessary that component B and/or component C is liquid and a homogeneous composition of components A, B and C prepared by mixing under heat in the absence of a curing catalyst or component D is a viscous liquid at room temperature. As for the curing catalyst or component D, it is dissolved in the acid anhydride or separately dissolved in a small amount of a solvent and then mixed uniformly into the liquid composition. Or, the liquid composition may take the form of a dispersion of an adduct of a tertiary amine and an organic acid or a microencapsulated curing catalyst in a liquid mixture of components A, B and C.

The resin composition of this invention comprises the aforementioned four essential components A, B, C and D as the whole or principal portion of the resin constituents, but it is allowable to incorporate additives compatible with the resin constituents in a small amount, for example, 20 wt % or less, depending upon the mode of usage. Such additives include agents providing a variety of functions such as the aforementioned initiators, antioxidants, parting agents, silane coupling agents and flame retardants. In addition, fillers such as silica particles, rubber and pigments, thickeners, colorants and stress-lessening particles are dispersed in the resin composition of this invention to prepare a material for sealing semiconductors. In this case, the fillers can be added in a large amount, equal to or more than that of the resin composition of this invention. In the case where the resin composition of this invention containing fillers is used as a liquid resin molding material, it is satisfactory if the composition free of the fillers is liquid.

Still more, the resin composition of this invention can be made to serve as a resin composition for optical use. In this case, it is possible to improve the practical properties of the material by incorporation of additives such as known antioxidants and ultraviolet absorbers to the extent that the incorporation does not deteriorate the optical properties of the material. Moreover, it is possible to improve the release properties of the cured material from the mold by the use or addition of known external and/or internal mold release agents. In the case where the resin composition is used as an adhesive or coating, it is possible to add a solvent or a diluents for control of the viscosity or to add a silane coupling agent such as γ-glycidylpropyltrimethoxysilane or an agent providing close contact such as triazinethiol for improvement of the adhesion to the substrate. Addition of silicon- or fluorine-based surfactants is also allowed to control smoothness and uneven evaporation during coating.

A procedure desirable for curing the resin composition of this invention as a molding material is the following; an aromatic episulfide (component A) is mixed with a glycidyl ether compound having two or more glycidyl groups in its molecule (component B) in advance at room temperature or under heat to prepare mixture AB, an acid anhydride (component C) and a curing catalyst (component D) are separately mixed to prepare mixture CD, an additive such as an antioxidant, an ultraviolet absorber or a parting agent is dissolved or dispersed in either of mixture AB or CD as needed, and the two mixtures are blended immediately before use. A solution of the curing catalyst or component D prepared by separately dissolving it in a small amount of a solvent is added to the liquid composition or an adduct of a tertiary amine and an organic acid or a microencapsulated curing catalyst is dispersed in a liquid mixture of components A, B and C. Incorporation of the aforementioned additives and fillers can be performed simultaneously or separately when mixture AB is blended with mixture CD. The liquid resin molding material thus formulated is further kneaded and defoamed to give a homogeneous material.

As for the molding of the resin composition of this invention, a suitable method is sealing by coating, casting or potting.

The curing time is normally 1–60 hours and the curing temperature is 50–200° C., preferably 80–180° C. Upon completion of the curing, the material is annealed at a temperature lower than the curing temperature or at 50–180° C. for a period of 10 minutes to 5 hours and this treatment is desirable for removing strain from the cured material.

In the preparation of an optical material from the resin composition of this invention, a desirable procedure is the following; an aromatic episulfide (component A) is mixed with a glycidyl compound (component B) in advance at room temperature or under heat, an acid anhydride (component C) and a curing catalyst (component D) are separately mixed, an additive such as an antioxidant, an ultraviolet absorber and a parting agent is dissolved in one of the mixtures better suited for dissolving the additive, and the two mixtures are blended immediately before use. The resulting composition is cast in a mold made of glass or metal, subjected to curing under heat and removed from the mold to give the target optical material. It is desirable to degas the raw materials and additives under reduced pressure before or after mixing For prevention of the generation of air bubbles during curing.

A variety of transparent optical materials are used in liquid crystal displays; for example, prisms and micro-lenses are formed by screen printing on light dispersing plates, light leading plates and prism sheets. The resin composition of this invention or an optical material prepared therefrom can be used in such applications.

The resin composition of this invention can also be applied as an adhesive or coating to optical lenses, prisms, optical fibers and optical films. The refractive index of common optical materials is mostly in the range of 1.5–1.62 (for example, 1.586 for polycarbonate, 1.51–1.57 for MS resin and 1.61 for polyarylate) and an adhesive or coating matched in refractive index to these materials is prepared and used to prevent reflection at the interface due to the difference in refractive index.

When the resin composition of this invention is used as an adhesive or coating for optical materials, components A, B and C are mixed in such a manner as to obtain a composition matching to the substrate in refractive index, a solvent or a diluent is added to adjust the viscosity, a silane coupling agent such as γ-glycidylpropyltrimethoxysilane or an agent for providing close contact such as triazinethiol is added to improve adhesion to the substrate, and a silicon- or fluorine-based surfactant is added to control smoothness and uneven evaporation during coating. The homogeneous resin composition thus prepared is applied to the substrate which is surface-treated as needed, the whole or a part of the solvent is removed by a suitable drying method and the remaining composition is heated at 50–200° C. to effect curing either under pressure when used as an adhesive or as it is when used as a coating.

The resin composition of this invention can be used suitably as a sealing material for light emitting diodes (LED) on account of its transparency, low moisture absorption and good heat resistance. For sealing of LED, an LED device mounted on a metal or ceramic stem or a metal frame is covered by a method such as casting and transfer molding and sealed by heating.

PREFERRED EMBODIMENTS OF THE INVENTION

This invention will be described in detail below with reference to the accompanying examples.

SYNTHETIC EXAMPLE 1

To 2,630 ml of water was added 325 g (6.49 eq) of special-grade sulfuric acid with stirring and 494 g (6.49 eq) of thiorea was suspended in it. To the suspension was added 1.00 kg (5.41 eq) of Epikote 828 (bisphenol A type epoxy resin with an epoxy equivalent 187, available from Yuka Shell Epoxy K.K.) in small portions with stirring and, after completion of addition, the resulting mixture was stirred at 50° C. for 6 hours, The thiuronium sulfate formed as colorless solid was filtered by the use of a glass filter, ground and washed with water until the pH of the filtrate became 3–5 and dried under reduced pressure at room temperature. Following this, the salt was ground and stirred in 2 kg of dichloromethane to remove the unreacted raw material epoxy resin. The solid was separated by filtration, washed with the same amount of dichloromethane, dried in vacuum at room temperature and ground.

To a solution of 416 g of $Na_2CO_3$ in 5,300 ml of water was added 1.00 kg (3.27 eq) of the aforementioned well-ground thiuronium sulfate and the mixture was stirred at 60° C. for 6 hours. The product (colorless solid) was filtered by the use of a glass filter, ground and washed with water until the pH of the filtrate became 8 or so and dried at room temperature under reduced pressure. Furthermore, the product was dissolved in a 6-fold amount of toluene, separated from the insoluble matters by filtration, dried over magnesium sulfate, passed through a short column of silica gel, and stripped of the toluene to give 580 g of an episulfide compound (A1).

A solution of 100 mg of the episulfide compound (A1) in deuterated chloroform was prepared and subjected to proton NMR analysis at 270 MHz. The signals at 2.7 ppm and 2.9 ppm corresponding to the methylene group in the epoxy ring almost disappeared and the signals corresponding to the methylene group in the thiiran ring appeared at 2.3 ppm and 2.6 ppm. This indicates that the glycidyl group was converted to the β-epithiopropyl group. The compound melted at 85° C.

The properties of the compositions and cured products were determined by the following methods.

<Viscosity> The viscosity was determined at 25° C. by the use of a BH type viscometer. (Specific gravity of liquid) The specific gravity of a liquid specimen was determined at 25° C. by the use of a pycnometer.

<Specific gravity of cured product> The specific gravity of cured product was determined by applying the buoyancy in water method to a specimen which was a 25 mm by 25 mm square with a thickness of 3 mm.

<Curing shrinkage> The curing shrinkage was calculated as follows from the specific gravity of liquid (dL) and the specific gravity of cured product (ds), respectively determined by the aforementioned methods;

$$\text{Curing shrinkage (\%)}=100\times(ds-dL)/dL$$

<Gel time> A specimen was heated on a hot plate at the specified temperature and time for the specimen to lose fluidity was determined.

<Appearance>The cured product was visually observed for the presence or absence of clouding.

<Water absorption 1> The saturated water absorption of a specimen of the cured product, a 25 mm by 25 mm square with a thickness of 3 mm, was determined at 85° C. and 85% RH. However, no determination was made for cured products to be described later whose glass transition temperature Tg was below 110° C.

<Water absorption 2> The water absorption of a specimen of the cured product, a 25 mm by 25 mm square with a thickness of 3 mm, was determined by holding it at 121° C. and 100% RH for 48 hours. However, no determination was made for cured products to be described later whose glass transition temperature Tg was below 130° C.

<Water absorption 3> The water absorption was determined by immersing a specimen of the cured product, a 50 mm by 50 mm square with a thickness of 3 mm, in water at 23° C. for 24 hours (JIS 7209).

<Glass transition temperature Tg1 by measurement of dynamic viscoelasticity> A specimen of the cured product, 5 mm in width, 15 mm in length and 1 mm in thickness, was determined for its dynamic viscoelasticity at a frequency of 11 Hz in a tensile mode by heating from room temperature to 250° C. at a rate of 5° C./min and the peak temperature of tan δ was taken as Tg1 (° C.).

<Glass transition temperature Tg2 by differential scanning calorimetry (DSC)> A specimen weighing approximately 20 mg of the cured product was heated from room temperature to 250° C. at a rate of 10° C./min and the glass transition temperature Tg2 (° C.) was obtained from an inflection point of the heat flow curve. Only one inflection point was observed for any of the cured products.

<Refractive index $n_D$ and Abbe number> An Abbe refractometer was used at 25° C. for the determination.

<Total light transmission> The transmission with C light source as standard was determined by the use of a 3 mm-thick specimen of the cured product.

<Heat distortion temperature (HDT) (° C.)> The heat distortion temperature was determined according to JIS-K7207 by the use of a specimen of the cured product, 12.5 mm in width, 120 mm in length and 3 mm in thickness.

<Measurement of infrared (IR) spectrum> Taking the absorption peak attributable to the benzene ring at 1510 $cm^{-1}$ as standard, the intensity ratio of respective absorption peaks of the epoxy ring at 915 $cm^{-1}$, the thiiran ring at 620 $cm^{-1}$ and the acid anhydride group at 1780 $cm^{-1}$ before curing was taken as 1 and the intensity ratio of absorption after curing was used to estimate the survival rate of respective reactive groups. When an absorption peak is within the range of fluctuation of the base line of a spectrum, it was below the detection limit and marked by * in the tables. When an absorption peak is observed more or less, it is marked by tr in the tables.

The crosslinking structure in the cured product was estimated from the ratio of absorption peak of the thioester linkage at 1705 $cm^{-1}$ to that of the ester linkage at 1735 $cm^{-1}$ to be formed in the cured product. As the two absorption peaks are located close to each other, however, the thioester linkage could be determined as separate entity when the ratio was 0.3 or more. Any determination giving a value below this was below the detection limit and is marked by * in the tables.

EXAMPLE 1

In a beaker were mixed 50 g of the episulfide compound (A1) prepared in Synthetic Example 1 and 50 g of Epikote 828 (epoxy equivalent 187, available from Yuka Shell Epoxy K.K.) (b1) by heating at 80° C. to give a homogeneous viscous liquid (mixture AB). Separately, 1.37 g of tetra-n-butylammonium chloride (D1) was dissolved in 35.4 g of methylhexahydrophthalic anhydride (C1) to form a homogeneous solution (mixture CD) and this mixture was blended with the aforementioned viscous liquid (mixture AB) and 0.75 g of S-phenyl thioacetate (S1) at 50° C. to give the target composition or a liquid resin molding material, The composition was cast into a mold which was made of a silicone rubber sheet and covered with an aluminum foil and heated at 100° C. for 30 minutes and then at 160° C. for 2 hours to give a transparent molded article (cured product) with a thickness of 1–3 mm.

EXAMPLE 2 AND COMPARATIVE EXAMPLES 1 AND 2

Compositions were prepared by using the formulations shown in Tables 1 and 2, cured as in Example 1 and tested for the properties. In Example 2 and Comparative Example 2, the molar ratio of the total of the glycidyl and β-episulfide groups to the acid anhydride group was fixed at 2.44 and the molar ratio of the glycidyl group to the β-epithiopropyl group was changed.

EXAMPLES 3 AND 4

The experiment was carried out as in Example 1 except using 35.4 g of methylhexahydrophthalic anhydride (C1) and 50 g of Epikote 828 (b1) in order to obtain 1.27 moles of the glycidyl group per 1 mole of the acid anhydride group and using such an amount of the aforementioned compound (A1) or component A as to obtain 0.58 mole and 1.76 moles of compound (A1) per 1 mole of the acid anhydride group. The epoxy ring, the thiiran ring and the acid anhydride group remained in the cured products in an amount below the detection limit in infrared spectrometry in a series of examples.

EXAMPLE 5

The experiment was carried out as in Example 1 except using 1.17 moles of the β-epithiopropyl group and 0.635 mole of the glycidyl group per 1 mole of the acid anhydride group.

EXAMPLES 6 AND 7 AND COMPARATIVE EXAMPLE 3

The experiment was carried out as in Example 1 except changing the amount of methylhexahydrophthalic anhydride and adjusting the total of the glycidyl and β-episulfide groups at 1.09–2.94 moles per 1 mole of the acid anhydride group.

EXAMPLE 8

The experiment was carried out as in Example 1 except removing S-phenyl thioacetate (S1) from the formulation and the properties of the cured product practically remained unchanged.

The formulations for preparing the compositions the results of measurements in Examples 1–8 and Comparative Examples 1–3 are shown in Tables 1 and 2. Low water absorption and good heat resistance (HDT and Tg) were obtained in each of the examples, but water absorption or heat resistance or both were inferior in each of the comparative examples.

In the tables, the ratio of absorption intensity in IR analysis indicates that of thioester to ester. A to D in the molar and weight ratios of functional groups refer to components A to D and component A is assumed to have nothing but the β-epithiopropyl group. The symbols in the tables mean the following.

A1: Episulfide compound obtained in Synthetic Example 1
b1: Epikote 828
b2: YDF-8170C
b3: CY184
C1: Methylhexahydrophthalic anhydride
D1: Tetra-n-butylammonium chloride
S1: S-Phenyl thioacetate

TABLE 1

|  | Ex. 1 | Ex. 2 | Ex. 3 | Ex. 4 | Ex. 5 | Ex. 6 |
|---|---|---|---|---|---|---|
| Formulation (g) | | | | | | |
| Component A; A1 | 50.0 | 75.0 | 25.0 | 75.0 | 50.0 | 50.0 |
| Component B; b1 | 50.0 | 25.0 | 50.0 | 50.0 | 25.0 | 50.0 |
| Component C; C1 | 35.4 | 34.7 | 35.4 | 35.4 | 35.4 | 53.1 |
| Component D; D1 | 1.37 | 1.37 | 1.37 | 1.37 | 1.37 | 2.06 |
| Initiator; S1 | 0.75 | 0.75 | 0.75 | 0.75 | 0.75 | 0.75 |
| Equivalent ratio of functional groups | | | | | | |
| (A + B)/C | 2.44 | 2.44 | 1.86 | 3.02 | 1.805 | 1.63 |
| A/C | 1.17 | 1.79 | 0.589 | 1.76 | 1.17 | 0.780 |
| B/C | 1.27 | 0.644 | 1.27 | 1.27 | 0.635 | 0.847 |
| Concentration of component D (%) 100*D/(A + B + C) | 1.01 | 1.02 | 1.24 | 0.85 | 1.24 | 1.34 |
| Specific gravity and shrinkage | | | | | | |
| sp. gr. of composition | 1.173 | 1.179 | 1.159 | 1.167 | 1.175 | 1.171 |
| sp. gr. of cured product | 1.197 | 1.203 | 1.183 | 1.192 | 1.200 | 1.196 |
| Curing shrinkage (%) | 2.01 | 2.00 | 2.03 | 2.10 | 2.08 | 2.09 |
| Appearance | TP* | TP* | TP* | TP* | TP* | TP* |
| Water absorption 1 | 0.68 | 0.81 | 0.99 | 0.82 | 0.92 | 0.82 |
| Water absorption 2 | 1.15 | 1.55 | 1.5 | 1.22 | 1.6 | 1.45 |
| Thermal properties | | | | | | |
| Tg1 (° C.) | 170 | 145 | 170 | 170 | 148 | 163 |
| Tg2 | 143 | 135 | 140 | 140 | 125 | 133 |
| IR analysis | | | | | | |
| Residual thiiran ring (%) | * | * | * | * | * | * |
| Residual epoxy ring (%) | * | * | * | * | * | * |
| Residual acid anhydride group (%) | * | * | * | * | * | * |
| Ratio of absorption intensity | tr | 0.33 | * | tr | 0.45 | 0.31 |

TP*: Transparent

TABLE 2

|  | Ex. 7 | Ex. 8 | Co. ex. 1 | Co. ex. 2 | Co. ex. 3 |
|---|---|---|---|---|---|
| Formulation (g) | | | | | |
| Component A; A1 | 50.0 | 50.0 | 0.0 | 25.0 | 50.0 |
| Component B; b1 | 50.0 | 50.0 | 50.0 | 75.0 | 50.0 |
| Component C; C1 | 29.4 | 35.4 | 35.4 | 36.1 | 70.8 |
| Component D; D1 | 1.14 | 1.37 | 1.35 | 1.37 | 2.7 |
| Initiator; S1 | 0.75 | 0 | 0.75 | 0.75 | 1.5 |
| Equivalent ratio of functional groups | | | | | |
| (A + B)/C | 2.94 | 2.44 | 1.27 | 2.44 | 1.09 |
| A/C | 1.410 | 1.17 | 0 | 0.578 | 0.522 |
| B/C | 1.530 | 1.27 | 1.27 | 1.87 | 0.567 |
| Concentration of component D (%) 100*D/(A + B + C) (%) | 0.88 | 1.01 | 1.58 | 1.01 | 1.58 |
| Specific gravity and shrinkage | | | | | |
| sp. gr. of composition | 1.174 | 1.173 | 1.150 | 1.170 | 1.169 |
| sp. gr. of cured product | 1.198 | 1.196 | 1.172 | 1.196 | 1.195 |
| Curing shrinkage (%) | 2.00 | 1.92 | 1.88 | 2.17 | 2.18 |
| Appearance | T.P* | T.P* | T.P* | T.P* | T.P* |
| Water absorption 1 | 0.72 | 0.71 | 1.25 | 0.82 | 3.25 |
| Water absorption 2 | 1.4 | 1.21 | 2.28 | N.M* | 4.41 |
| Thermal properties | | | | | |
| Tg1 (° C.) | 158 | 170 | 160 | 137 | 138 |
| Tg2 (° C.) | 132 | 140 | 128 | 115 | 112 |
| IR analysis | | | | | |
| Residual thiiran ring (%) | * | * | — | * | * |
| Residual epoxy ring (%) | * | * | * | * | * |
| Residual acid anhydride group (%) | * | * | * | * | * |
| Ratio of absorption intensity | tr | tr | — | tr | 0.9 |

N.M*; not measured

EXAMPLES 9 AND 10 AND COMPARATIVE EXAMPLES 4 AND 5

Compositions were prepared in Examples 9 and 10 as in Example 1 except using YDF-8170C (bisphenol F type epoxy resin with an epoxy equivalent of 156, available from Tohto Kasei Co., Ltd.) (b2) or CY184 (hexahydrophthalic acid diglycidyl ester with an epoxy equivalent of 170, available from Ciba Specialty Chemicals Co., Ltd.) (b3) as component B and the cured products were tested for their properties. In Comparative Examples 4 and 5, the cured products were prepared as in Comparative Example 1 without using the episulfide compound (A1).

The formulation for preparing the compositions and the results of measurement are shown in Table 3.

In Examples 9 and 10, the glass transition temperature rose higher by 20–30° C., the water absorption was low and the viscosity was 100 poises or less initially and 100 poises or less even after storage at room temperature for 24 hours, satisfactory for use as a liquid sealing material.

TABLE 3

|  | Ex. 1 | Ex. 9 | Ex. 10 | Co. ex. 4 | Co. ex. 5 |
|---|---|---|---|---|---|
| Formulation (g) | | | | | |
| Component A; A1 | 50.0 | 50.0 | 50.0 | | |
| Component B; | | | | | |
| b1 | 50.0 | | | | |
| b2 | | 42.8 | | 42.8 | |
| b3 | | | 45.6 | | 45.6 |
| Component C; C1 | 35.4 | 35.4 | 35.4 | 35.4 | 35.4 |
| Component D; D1 | 1.37 | 1.37 | 1.37 | 1.37 | 1.37 |
| Initiator; S1 | 0.75 | 0.75 | 0.75 | 0.75 | 0.75 |
| Equivalent ratio of functional groups | | | | | |
| (A + B)/C | 2.44 | 2.44 | 2.44 | 2.44 | 2.44 |
| A/C | 1.17 | 1.17 | 1.17 | 1.17 | 1.17 |
| B/C | 1.27 | 1.27 | 1.27 | 1.27 | 1.27 |
| Concentration of catalyst (%) 100*D/(A + B + C) | 1.01 | 1.07 | 1.05 | 1.75 | 1.69 |
| Properties of composition | | | | | |
| Initial viscosity (PS) | 35 | 17 | 17 | 0.2 | 0.7 |
| Viscosity after 24 hr storage at R.T.* (PS) | 62 | 30 | 30 | 1 | 3 |
| Optical properties: Appearance | T.P* | T.P* | T.P* | T.P* | T.P* |
| Water absorption 1 | 0.68 | 0.58 | 0.5 | 2.5 | 2 |
| Water absorption 2 | 1.15 | 1.3 | 1.6 | 3.6 | 3.8 |
| Thermal properties | | | | | |
| Tg1 (° C.) | 170 | 163 | 151 | 135 | 130 |
| Tg2 (° C.) | 143 | 135 | 122 | 122 | 106 |
| IR analysis | | | | | |
| Residual thiiran ring (%) | * | * | * | — | — |
| Residual epoxy ring (%) | * | * | * | * | * |
| Residual acid anhydride group (%) | * | * | * | * | * |
| Ratio of absorption intensity | tr | tr | tr | — | — |

R.T*; Room temperature

EXAMPLES 11–13

Compositions were prepared as in Example 1 using the same amounts of components A, B and C except replacing the curing catalyst (component D) by tetra-n-butylammonium chloride in Example 11, by 1,8-diazabicyclo(5,4,0)undecene-7 (DBU) in Example 12 and by triphenylphosphine in Example 13. However, S-phenyl thioacetate corresponding to the initiator was not used in Examples 12 and 13. That is, compositions were prepared in Examples 11–13 as in Example 1 by using component D in the amount shown in Table 4 without the initiator S-phenyl thioacetate in Examples 12 and 13. The compositions were cured under the conditions shown in Table 4 and the glass transition temperature Tg2 of the cured products was determined by DSC. Each cured product was heated in air from room temperature to 260° C. at a rate of 10° C./min, held at 260° C. for 2 hours and the decrease in weight by heating was measured by thermogravimetric analysis (TGA). Retention of the weight was 99% or more in each case. Each cured product remaining after TGA has a heat history of 260° C. and comparison of the degree of coloration indicates that the cured product in Example 11 was transparent and light yellow and practically free of coloration while the cured products in Examples 12 and 13 showed coloration increasing in this order. The glass transition temperature Tg2 of the compositions in Examples 11 and 12 reached nearly 140° C. when cured at 120–160° C.

The formulations for preparing the compositions, the curing conditions and the results of measurement are shown in Table 4.

TABLE 4

|  | Ex. 11 | | | | | | Ex. 12 | | | | | | Ex. 13 | | | | | |
|---|---|---|---|---|---|---|---|---|---|---|---|---|---|---|---|---|---|---|
| Formulation Component D 100*D/(A + B + C) | Tetra-n-butyl-ammonium chloride 1.01 | | | | | | DBU 1.01 | | | | | | Triphenylphosphine 1.01 | | | | | |
| Curing conditions | | | | | | | | | | | | | | | | | | |
| 1st step | | | | | | | | | | | | | | | | | | |
| temp. (° C.) | 120 | 120 | 120 | 120 | 120 | 120 | 120 | 120 | 120 | 120 | 120 | 120 | 120 | 120 | 120 | 120 | 120 | 120 |
| (hrs) | 22 | 34 | 58 | 22 | 22 | 22 | 22 | 34 | 58 | 22 | 22 | 22 | 22 | 34 | 58 | 22 | 22 | 22 |
| 2nd step | | | | | | | | | | | | | | | | | | |
| temp. (° C.) | | | | 130 | 130 | 160 | | | | 130 | 130 | 160 | | | | 130 | 130 | 160 |
| (hrs) | | | | 12 | 36 | 2 | | | | 12 | 36 | 2 | | | | 12 | 36 | 2 |
| Measurement by DSC Tg2 (° C.) | 137 | 138 | 141 | 138 | 141 | 143 | 139 | 140 | 140 | 140 | 139 | 143 | 112 | 114 | 125 | 122 | 127 | 130 |
| Measurement by TCA Weight retention (%) | | | | | | 99 | | | | | | 99 | | | | | | 99 |

EXAMPLE 14 AND COMPARATIVE EXAMPLE 6

The compositions of Example 1 and Comparative Example 1 were heated on a hot plate and the gel time or the time in which the fluidity was lost, was measured respectively in Example 14 and Comparative Example 14. It was found that the gel time of the former was nearly equal to that of the latter or the conventional Epikote 828/acid anhydride curing system and hence the rate of curing of the former was high. The results are shown in Table 5.

TABLE 5

| Curing temp. (° C.) | Ex. 14 (min) | Co. ex. 6 (min) |
|---|---|---|
| 120 | 9.0 | 8.5 |
| 160 | 1.8 | 1.8 |
| 180 | 0.79 | 0.71 |

EXAMPLES 15–24 AND COMPARATIVE EXAMPLE 7

Each of the compositions formulated as in Examples 1–10 was mixed with fused silica as a filler and γ-glycidylpropyltrimethoxysilane as a coupling agent in the amounts specified in Table 6 and kneaded in a three-roll kneader to give a filled liquid composition. The composition was applied to a mock device (line width 8 μm, interline space 8 μm, a silicon nitride film present, number of pins 124) made by inner bonding to a single-sided film carrier (thickness of Kapton film 50 μm, thickness of adhesive 20 μm, thickness of copper foil 35 μm) and cured by heating at 100° C. for 30 minutes and then at 160° C. for 2 hours. The cured device was subjected to the pressure cooker test (121° C., 100% RH) and evaluated to be reliable when the time required to generate 50% rejects by broken wire exceeds 300 hours and marked by ○ in the tables. Any of the examples 15–24 in which the compound (A1) was used showed good reliability while Comparative Example 7 showed reliability of less than 300 hours.

The formulations and the results of measurement are shown in Tables 6 and 7. The notation γ-G in the tables designates γ-glycidylpropyltrimethoxysilane.

TABLE 6

| Ex. | 15 | 16 | 17 | 18 | 19 | 20 |
|---|---|---|---|---|---|---|
| Formulation (g) | | | | | | |
| Component A; A1 | 7.25 | 10.95 | 4.45 | 9.23 | 8.90 | 6.40 |
| Component B; b1 | 7.25 | 3.65 | 8.90 | 6.15 | 4.45 | 6.40 |
| Component C; C1 | 5.13 | 5.07 | 6.30 | 4.35 | 6.30 | 6.80 |
| Component D; D1 | 0.20 | 0.20 | 0.24 | 0.17 | 0.24 | 0.26 |
| Initiator; S1 | 0.11 | 0.11 | 0.13 | 0.09 | 0.13 | 0.10 |
| Fused silica | 79.8 | 79.8 | 79.8 | 79.8 | 79.8 | 79.8 |
| γ-G | 0.20 | 0.20 | 0.20 | 0.20 | 0.20 | 0.20 |
| Corresponding example | 1 | 2 | 3 | 4 | 5 | 6 |
| Moisture resistance reliability Pressure cooker test | ○ | ○ | ○ | ○ | ○ | ○ |

TABLE 7

| Ex. | 21 | 22 | 23 | 24 | Co. Ex. 7 |
|---|---|---|---|---|---|
| Formulation (g) | | | | | |
| Component A; A1 | 7.65 | 7.25 | 7.65 | 7.50 | 0.00 |
| Component B; b1 | 7.65 | 7.25 | 6.55 | 6.84 | 11.45 |
| Component C; C1 | 4.44 | 5.13 | 5.42 | 5.31 | 8.11 |
| Component D; D1 | 0.17 | 0.20 | 0.21 | 0.21 | 0.31 |
| Initiator; S1 | 0.11 | — | 0.11 | 0.11 | 0.17 |
| Fused silica | 79.8 | 79.8 | 79.8 | 79.8 | 79.8 |
| γ-G | 0.20 | 0.20 | 0.20 | 0.20 | 0.20 |
| Corresponding example | 7 | 8 | 9 | 10 | Co. Ex. 1 |
| Moisture resistance reliability Pressure cooker test | ○ | ○ | ○ | ○ | x |

EXAMPLE 25

In a beaker were mixed 25 g of the episulfide compound (A1) prepared in Synthetic Example 1 and 75 g of Epikote 828 (b1) by heating at 80° C. to give a homogeneous viscous liquid. Separately, 1.37 g of tetra-n-butylammonium chloride (D1) was dissolved in 36.1 g of methylhexahydrophthalic anhydride (C1) to form a homogeneous solution and the solution was mixed with the aforementioned viscous liquid and 0.75 g of S-phenyl thioacetate (S1) at 50° C. to give the target composition. The composition was cast into a mold which was made of a silicone rubber sheet and covered with an aluminum foil and heated at 100° C. for 1 hour and then at 160° C. for 2 hours to give a transparent molded article with a thickness of 1–3 mm. The article was tested for its properties.

EXAMPLES 26 AND 27

Compositions were prepared as in Example 25 by fixing the molar ratio of the total of the glycidyl and β-epithiopropyl groups to the acid anhydride group at 2.44 and changing the molar ratio of the glycidyl group to the β-epithiopropyl group as specified in Table 8, cured and tested for their properties.

COMPARATIVE EXAMPLES 8 AND 9

Compositions were prepared as in Example 25 by fixing the molar ratio of the glycidyl group alone to the acid anhydride group or the β-epithiopropyl group alone to the acid anhydride group at 2.44 as specified in Table 8, cured and tested for their properties.

The formulations and the measured values of the properties are shown in Table 8. In this and the following tables, A, B, C and D in the molar or weight ratio of functional groups correspond to components A, B, C and D, A is computed on the assumption that all the functional groups are substantially β-epithiopropyl groups and the ratio thioester/ester refers to the ratio of absorption intensity.

TABLE 8

| | Ex. 25 | Ex. 26 | Ex. 27 | Co. ex. 8 | Co. Ex. 9 |
|---|---|---|---|---|---|
| Formulation (g) | | | | | |
| Component A; A1 | 25.0 | 50.0 | 75.0 | 0.0 | 100.0 |
| Component B; b1 | 75.0 | 50.0 | 25.0 | 100.0 | 0.0 |
| Component C; C1 | 36.1 | 35.4 | 34.7 | 36.9 | 34 |
| Component D; D1 | 1.37 | 1.37 | 1.37 | 1.37 | 1.37 |
| Initiator; S1 | 0.75 | 0.75 | 0.75 | 0.75 | 0.75 |
| Equivalent ratio of | | | | | |

TABLE 8-continued

|  | Ex. 25 | Ex. 26 | Ex. 27 | Co. ex. 8 | Co. Ex. 9 |
|---|---|---|---|---|---|
| functional groups |  |  |  |  |  |
| (A + B)/C | 2.44 | 2.44 | 2.44 | 2.44 | 2.44 |
| A/C | 0.578 | 1.17 | 1.79 | 0 | 2.44 |
| B/C | 1.87 | 1.27 | 0.644 | 2.44 | 0 |
| Concentration of catalyst 100*D/(A + B + C) | 1.01 | 1.01 | 1.02 | 1.00 | 1.02 |
| Specific gravity and shrinkage |  |  |  |  |  |
| sp. gr. of composition | 1.170 | 1.173 | 1.179 | 1.166 | 1.179 |
| sp. gr. of cured product | 1.196 | 1.197 | 1.203 | 1.196 | 1.214 |
| Curing shrinkage (%) | 2.17 | 2.01 | 2.00 | 2.51 | 2.88 |
| Optical properties |  |  |  |  |  |
| Appearance | T.P* |  |  |  |  |
| Refractive index | 1.571 | 1.576 | 1.584 | 1.565 | 1.596 |
| Abbe number | 35.4 | 35.1 | 34.5 | 36.6 | 33.5 |
| Total light transmission (%) | 87 | 85 | 89 | 91 | 85 |
| Water absorption 3 | 0.12 | 0.13 | 0.1 | 0.11 | 0.09 |
| Water absorption 1 | 0.82 | 0.68 | 0.81 | — | — |
| Water absorption 2 | — | 1.15 | 1.55 | — | — |
| Thermal properties (° C.) |  |  |  |  |  |
| HDT | 100 | 130 | 123 | 50 | 51 |
| Tg1 | 137 | 170 | 145 | 100 | 90 |
| Tg2 | 115 | 143 | 135 | 82 | 55 |
| IR analysis |  |  |  |  |  |
| Residual thiiran ring (%) | * | * | * | — | 20 |
| Residual epoxy ring (%) | * | * | * | 50 | — |
| Residual acid anhydride group (%) | * | * | * | * | * |
| Thioester/ester | * | tr | 0.33 | — | 1 |

Low water absorption and high heat resistance were observed in each of the examples. Moreover, the refractive index was 1.55 or more and it could be made greater by increasing the proportion of component A.

On the other hand, the cured compositions in the comparative examples showed the presence of the unreacted epoxy group or the unreacted thiiran ring and inferior heat resistance.

EXAMPLES 28 AND 29 AND COMPARATIVE EXAMPLE 10

The experiment was carried out in Examples 28 and 29 as in Example 27 except using 35.4 g of methylhexahydrophthalic anhydride (C1) and 50 g of Epikote 828 (b1) to make the amount of the glycidyl group 1.27 motes per 1 mole of the acid anhydride group and using the compound (A1) as component A in such an amount as to make the amount of the compound (A1) 0.58–1.76 moles per 1 mote of the acid anhydride group. In Comparative Example 10, the experiment was carried out in the similar manner without addition of component A. In each example, the water absorption was low and the heat resistance was high even when the content of component A was increased. It was possible to adjust the refractive index up to 1.56–1.6 by increasing the content of component A. The epoxy ring, the thiiran ring and the acid anhydride group were below the detection limit when the cured compositions were submitted to infrared spectrometric analysis.

EXAMPLE 30

The experiment was carried out as in Example 26 except using 35.4 g of methylhexahydrophthalic anhydride (C1) and 50 g of the compound (A1) to make the amount of the β-epithiopropyl group 1.17 moles per 1 mole of the acid anhydride group and using Epikote 828 (b1) as component B in such an amount as to make the amount of b1 0.635 mole per 1 mole of the acid anhydride group. The water absorption was low and the heat resistance was high. The epoxy ring, the thiiran ring and the acid anhydride group were present below the detection limit in the cured composition when analyzed by infrared spectrometry.

EXAMPLES 31 AND 32 AND COMPARATIVE EXAMPLE 11

The experiment was carried out as in Example 26 white changing the amount of methylhexahydrophthalic anhydride in the manner specified in Tables 9 and 10 to make the total of the glycidyl and β-epithiopropyl groups 2.98, 1.63 or 1.09 moles per 1 mole of the acid anhydride group.

The glass transition temperature Tg1 was 160° C. or more and the water absorption was 1% or less when the total of the glycidyl and β-epithiopropyl groups was 2.98–1.63 moles per 1 mole of the acid anhydride group (Examples 26, 30 and 31). On the contrary, the glass transition temperature was low and the water absorption was high in Comparative Example 11 where the total of the glycidyl and β-episulfide groups was 1.09 moles per 1 mole of the acid anhydride group.

COMPARATIVE EXAMPLES 12–14

The experiment was carried out as in Example 26 or Comparative Examples 8 and 9 except not using the acid anhydride (component C). The results are shown in Table 10.

Comparative Example 12 relates to the cured product of component B and the component remained a viscous liquid even after treatment at 160° C. for 2 hours. Comparative Example 13 relates to the cured product of component A. Component A is a solid with a melting point of 85° C. and, when it was blended with tetra-n-butylammonium chloride by heating at 100° C., the resulting composition was still solid at room temperature. The composition was cured to give a transparent light yellow molded article with a glass transition temperature Tg1 of 140° C., a water absorption of 0.56% and a refractive index of 1.628. Comparative Example 14 relates to the cured product of a mixture of component A and component B; it was a transparent article at room temperature but its glass transition temperature Tg2 was below 100° C. as determined by DSC.

EXAMPLE 33

The experiment was carried out as in Example 26 except removing S-phenyl thioacetate from the formulation and the cured product showed practically the same properties. The formulations and the results of measurement in Examples 28–33 and Comparative Examples 10–14 are shown in Tables 9 and 10.

TABLE 9

| | Ex. 28 | Ex. 29 | Ex. 30 | Ex. 31 | Ex. 32 | Ex. 33 |
|---|---|---|---|---|---|---|
| Formulation (g) | | | | | | |
| Component A; A1 | 25.0 | 75.0 | 50.0 | 50.0 | 50.0 | 50.0 |
| Component B; b1 | 50.0 | 50.0 | 25.0 | 50.0 | 50.0 | 50.0 |
| Component C; C1 | 35.4 | 35.4 | 35.4 | 53.1 | 29.0 | 35.4 |
| Component D; D1 | 1.37 | 1.37 | 1.37 | 2.00 | 1.12 | 1.37 |
| Initiator; Si | 0.75 | 0.75 | 0.75 | 0.75 | 0.75 | 0 |
| Equivalent ratio of functional groups | | | | | | |
| (A + B)/C | 1.86 | 3.02 | 1.81 | 1.63 | 2.98 | 2.44 |
| A/C | 0.589 | 1.76 | 1.17 | 0.780 | 1.43 | 1.17 |
| B/C | 1.27 | 1.27 | 0.635 | 0.647 | 1.55 | 1.27 |
| Concentration of catalyst 100*D/(A + B + C) | 1.24 | 0.85 | 1.24 | 1.31 | 0.87 | 1.01 |
| Specific gravity and shrinkage | | | | | | |
| sp. gr. of composition | 1.159 | 1.167 | 1.175 | 1.171 | 1.174 | 1.173 |
| sp. gr. of cured product | 1.183 | 1.192 | 1.200 | 1.196 | 1.198 | 1.196 |
| Curing shrinkage (%) | 2.03 | 2.10 | 2.08 | 2.09 | 2.00 | 1.92 |
| Optical properties | | | | | | |
| Appearance | T.P* | T.P* | T.P* | T.P* | T.P* | T.P* |
| Refractive index | 1.555 | 1.584 | 1.581 | 1.57 | 1.58 | 1.575 |
| Water absorption 1 | 0.99 | 0.82 | 0.92 | 0.82 | 0.72 | 0.71 |
| Water absorption 2 | 1.5 | 1.22 | 1.6 | 1.45 | 1.4 | 1.21 |
| Thermal properties | | | | | | |
| Tg1 (° C.) | 170 | 170 | 148 | 163 | 158 | 170 |
| Tg2 (° C.) | 140 | 140 | 122 | 133 | 132 | 140 |
| IR analysis | | | | | | |
| Residual thiiran ring (%) | * | * | * | * | * | * |
| Residual epoxy ring (%) | * | * | * | * | * | * |
| Residual acid anhydride group (%) | * | * | * | * | * | * |
| Thioester/ester | * | tr | 0.45 | 0.31 | tr | tr |

TABLE 10

| | Co. ex. 10 | Co. ex. 11 | Co. ex. 12 | Co. ex. 13 | Co. ex. 14 |
|---|---|---|---|---|---|
| Formulation (g) | | | | | |
| Component A: A1 | 0.0 | 50.0 | 0 | 50.0 | 50.0 |
| Component B; b1 | 50.0 | 50.0 | 50.0 | 0 | 50.0 |
| Component C: C1 | 35.4 | 70.8 | 0 | 0 | 0 |
| Component D; D1 | 1.35 | 2.7 | 1.37 | 1.37 | 2.7 |
| Initiator; S1 | 0.75 | 1.5 | 0.75 | 0.75 | 1.5 |
| Equivalent ratio of functional groups | | | | | |
| (A + B)/C | 1.27 | 1.09 | — | — | — |
| A/C | 0 | 0.522 | — | — | — |
| B/C | 1.27 | 0.567 | — | — | — |
| Concentration of catalyst 100*D/(A + B + C) | 1.58 | 1.58 | 2.74 | 2.74 | 2.70 |
| Specific gravity and shrinkage | | | | | |
| sp. gr. of composition | 1.150 | 1.169 | — | 1.189 | — |
| sp. gr. of cured product | 1.172 | 1.195 | — | 1.214 | — |
| Curing shrinkage (%) | 1.88 | 2.18 | — | 2.06 | — |
| Optical properties | | | | | |
| Appearance | T.P* | T.P* | T.P* (liquid) | T.P* | Haze |
| Refractive index | 1.548 | N.M* | N.M* | 1.628 | N.M* |
| Water absorption 1 | 1.25 | 3.25 | — | 0.56 | — |
| Water absorption 2 | 2.28 | 4.41 | — | 1.54 | — |
| Thermal properties Tg1 (° C.) | 160 | 138 | — | 140 | — |
| Thermal properties Tg2 (° C.) | 128 | 112 | — | 113 | 50 |
| IR analysis | | | | | |
| Residual thiiran ring (%) | — | * | — | tr | * |
| Residual epoxy ring (%) | * | * | >80 | — | tr |
| Residual acid anhydride group (%) | * | * | — | — | — |
| Thioester/ester | — | 0.9 | — | — | — |

T.P*; transparent
N.M*; not measured

EXAMPLE 34 AND COMPARATIVE EXAMPLES 15 AND 16

The compositions were heated on a hot plate and the time in which the fluidity was lost was measured as the gel time. The results are shown in Table 11.

The ternary system of compound (A1)/Epikote 828/acid anhydride (the composition of Example 26 used in Example 34) showed nearly the same gel time as the conventional curing system of Epikote 828/acid anhydride (the composition of Comparative Example 10 used in Comparative Example 15) or curing progressed at a high rate. On the other hand, the system composed of the compound (A1) alone (the composition of Comparative Example 13 used in Comparative Example 16) cured slower than the ternary system in Example 34.

TABLE 11

| Curing temp. (° C.) | Ex. 34 Composition of Example 26 (min) | Co. ex. 15 Composition of Co. ex. 10 (min) | Co. ex. 16 Composition of Co. ex. 13 (min) |
|---|---|---|---|
| 120 | 9.0 | 8.5 | 44 |
| 160 | 1.8 | 1.8 | 9.45 |
| 180 | 0.79 | 0.71 | 1.75 |

EXAMPLES 35 AND 36 AND COMPARATIVE EXAMPLES 17 AND 18

Compositions were prepared as in Example 26 at the same ratio of functional groups except replacing component b1 with YDF-8170C (b2) or CY184 (b3), cured and tested for their properties. Moreover, cured products were prepared as in Comparative Example 10 by changing the epoxy compound and the properties were determined for comparison.

The formulations and the results are shown in Table 12. Addition of the episulfide compound raised the glass transition temperature by 20–30° C.

TABLE 12

|  | Ex. 35 | Ex. 36 | Co. ex. 17 | Co. ex. 18 |
|---|---|---|---|---|
| Formulation (g) |  |  |  |  |
| Component A; A1 | 50.0 | 50.0 |  |  |
| Component B; |  |  |  |  |
| b1 |  |  |  |  |
| b2 | 42.8 |  | 42.8 |  |
| b3 |  | 45.6 |  | 45.6 |
| Component C; C1 | 35.4 | 35.4 | 35.4 | 35.4 |
| Component D; D1 | 1.37 | 1.37 | 0.782 | 0.81 |
| Initiator; S1 | 0.75 | 0.75 | 0.391 | 0.391 |
| Equivalent ratio of functional groups |  |  |  |  |
| (A + B)/C | 2.44 | 2.44 | 1.27 | 1.27 |
| A/C | 1.17 | 1.79 | — | — |
| B/C | 1.27 | 1.27 | 1.27 | 1.27 |
| Concentration of catalyst (%) 100*D/(A + B + C) | 1.07 | 1.05 | 1.00 | 1.00 |
| Viscosity of composition (PS) |  |  |  |  |
| Initial viscosity | 17 | 17 | 0.2 | 0.7 |
| After 24 hr storage at room temperature | 30 | 30 | 1 | 3 |
| Optical properties; Appearance | T.P* | T.P* | T.P* | T.P* |
| Water absorption 1 | 0.58 | 0.5 | 2.5 | 2 |
| Water absorption 2 | 1.3 | 1.6 | 3.6 | 3.8 |
| Thermal properties |  |  |  |  |
| Tg1 (° C.) | 163 | 151 | 135 | 130 |
| Tg2 (° C.) | 135 | 122 | 122 | 106 |
| IR analysis |  |  |  |  |
| Residual thiiran ring (%) | * | * | — | — |
| Residual epoxy ring (%) | * | * | * | * |
| Residual acid anhydride group (%) | * | * | * | * |
| Ratio of absorption intensity | tr | tr | — | — |

INDUSTRIAL APPLICABILITY

The resin composition of this invention gives a cured product exhibiting excellent properties such as transparency, low moisture absorption, high heat resistance, moldability with precision and refractive index matching to that of parts to be joined. The optical material of this invention is suited for use in lenses, filters and optical films on account of its transparency, low moisture absorption, high heat resistance and high refractive index, Moreover, the resin molding material of this invention shows good moldability, cures with high moisture resistance and seals semiconductors with excellent resistance to moisture and heat.

What is claimed is:

1. A resin composition containing an aromatic episulfide which comprises an aromatic episulfide compound (component A) having two or more reactive groups represented by the following formula (1)

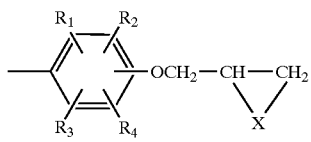

(wherein X is an oxygen atom or a sulfur atom with sulfur atom accounting for 50 mol % or more of X on the average and $R_1$–$R_4$ are independently a hydrogen atom, a halogen atom or an alkyl group with 1–4 carbon atoms) in its molecule, at least one kind of glycidyl compound (component B) selected from an aromatic glycidyl ether compound (B1) having two or more glycidyl groups in its molecule and a glycidyl ester compound (B2) having two or more glycidyl groups in its molecule, an acid anhydride (component C) and a curing catalyst (component D) as essential components and satisfies the following criteria regarding the ratio of functional groups in components A, B and C and the amounts of the components; the molar ratio of the acid anhydride group to the total of the glycidyl and β-epithiopropyl groups is 1 to 1.5–3.2, the molar ratio of the acid anhydride group to the β-epithiopropyl group is 1 to 0.5–2.2, the molar ratio of the acid anhydride group to the glycidyl group is 1 to 0.5–1.9, the amount of component D is 0.01–5 parts by weight per 100 parts by weight of the total of components A, B and C, and the cumulative amount of components A, B, C and D is 80 wt % or more of said resin composition;

wherein at least one of components B and C is a liquid, and wherein a thioester compound or a mercaptan compound is incorporated as an initiator in an amount of 0.01–5 parts by weight per 100 parts by weight of the total of components A, B and C.

2. A resin composition containing an aromatic episulfide as described in claim 1 wherein the glycidyl compound (component B) is a liquid aromatic glycidyl ether compound (B1) having two or more glycidyl groups in its molecule and/or a liquid glycidyl ester compound (B2) having two or more glycidyl groups in its molecule, the acid anhydride (component C) is a liquid acid anhydride, and the molar ratio of the acid anhydride group to the glycidyl group is 1 to 0.5–1.6.

3. An optical material which is obtained by curing the resin composition containing an aromatic episulfide described in claim 1 and exhibits a refractive index of 1.5 or more and a water absorption (saturated water absorption at 85° C. and 85% RH) of 1% or less.

* * * * *